United States Patent [19]
Hirokane et al.

[11] Patent Number: 5,633,838
[45] Date of Patent: May 27, 1997

[54] MAGNETO-OPTICAL RECORDING MEDIUM HAVING TWO REPRODUCTION LAYERS AND A METHOD FOR REPRODUCING THEREOF

[75] Inventors: Junji Hirokane, Nara; Junichiro Nakayama; Michinobu Mieda, both of Shiki-gun; Akira Takahashi, Nara, all of Japan

[73] Assignee: Sharp Kabushiki Kaisha, Osaka, Japan

[21] Appl. No.: 582,481

[22] Filed: Jan. 3, 1996

[30] Foreign Application Priority Data

Jan. 31, 1995 [JP] Japan ................................. 7-013768

[51] Int. Cl.$^6$ ................................................. G11B 11/00
[52] U.S. Cl. ................................. 369/13; 360/59
[58] Field of Search ........................... 369/13, 14, 275.2, 369/116, 110; 360/59, 114; 365/122; 428/694 ML

[56] References Cited

U.S. PATENT DOCUMENTS

| | | | |
|---|---|---|---|
| 5,329,512 | 7/1994 | Fukumoto et al. | 369/13 |
| 5,390,162 | 2/1995 | Fukumoto et al. | 369/116 |
| 5,432,774 | 7/1995 | Fukumoto et al. | 369/275.4 |

OTHER PUBLICATIONS

N. Nishimura et al., *MSR Disks with Three Magnetic Layers Using In-Plane Magnetization Films*, Digest of Moris '94, No. 29-K-04, p. 125, Sep. 29, 1994.

K. Tamanoi et al., *Magnetically-Induced Super Resolution Using Magneto-Static Coupling*, Digest of Moris '94, No. 29-K-05, p. 126, Sep. 29, 1994.

H. Miyamoto et al., *New Readout Technique Using Domain Collapse on Magnetic Multilayer*, Digest of Moris '94, No. 29-K-06, p. 127 Sep. 29, 1994.

*Primary Examiner*—Tan Dinh
*Attorney, Agent, or Firm*—David G. Conlin; Brian L. Michaelis

[57] ABSTRACT

A non-magnetic intermediate layer is provided between a reproductive layer and a recording layer. The reproductive layer is composed of a first reproductive layer and a second reproductive layer. When the first reproductive layer has a temperature that is higher than a first critical temperature, its stable magnetic domain width becomes smaller than a recording magnetic domain width so that the magnetization is reversed. When the second reproductive layer has a temperature that is higher than a second critical temperature, its stable magnetic domain width becomes larger than the recording magnetic domain width so that the reversed magnetic domain is collapsed. The first critical temperature is lower than the second critical temperature. A reproductive output having abrupt rising and falling can be obtained by the generation and the collapse of the reverse magnetic domain on the reproductive layer. For this reason, higher density recording required for larger capacity can be achieved.

24 Claims, 11 Drawing Sheets

FIG. 3(a)
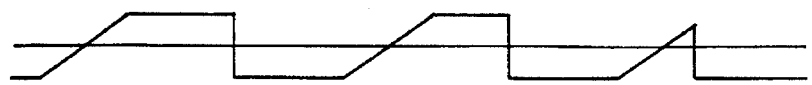
FIG. 3(b)
FIG. 3(c)
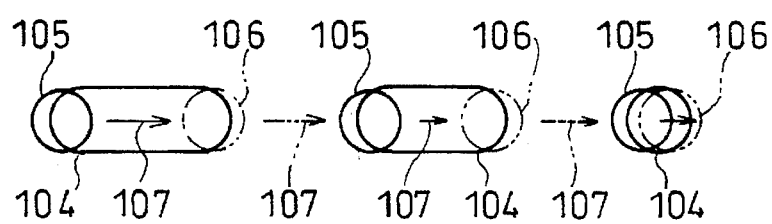
FIG. 3(d)
FIG. 4
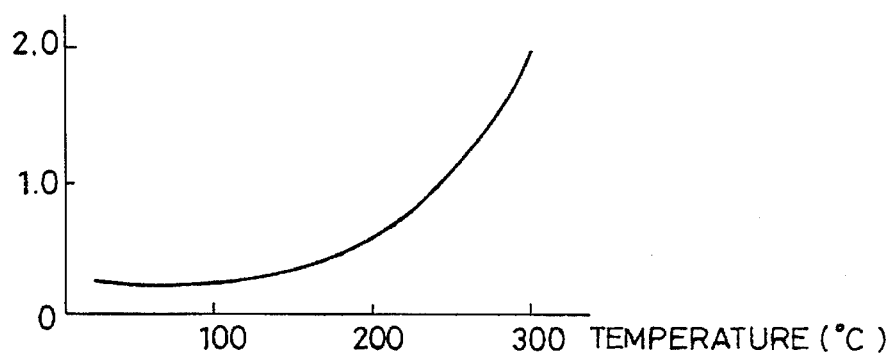
FIG. 5
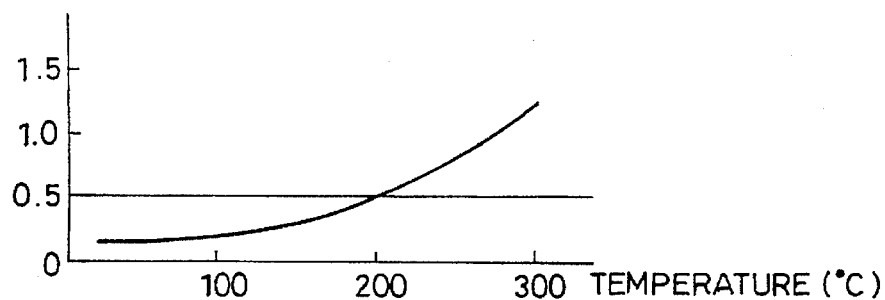

FIG. 15(a)
FIG. 15(b)
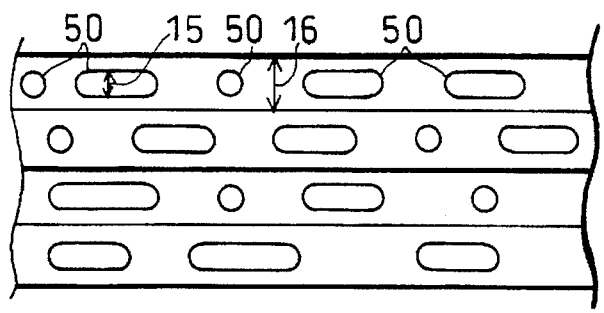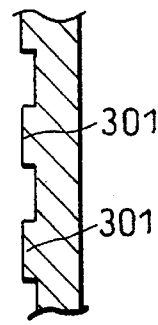
FIG. 16(a)
FIG. 16(b)
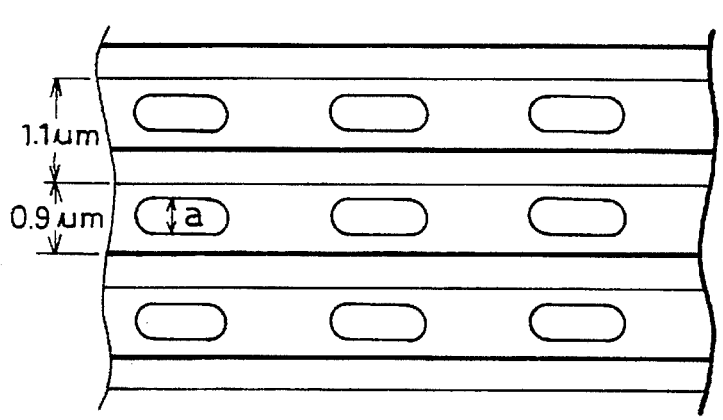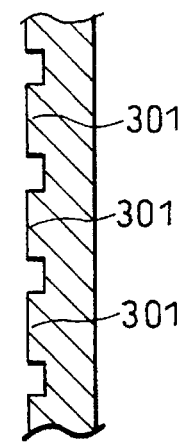
FIG. 17
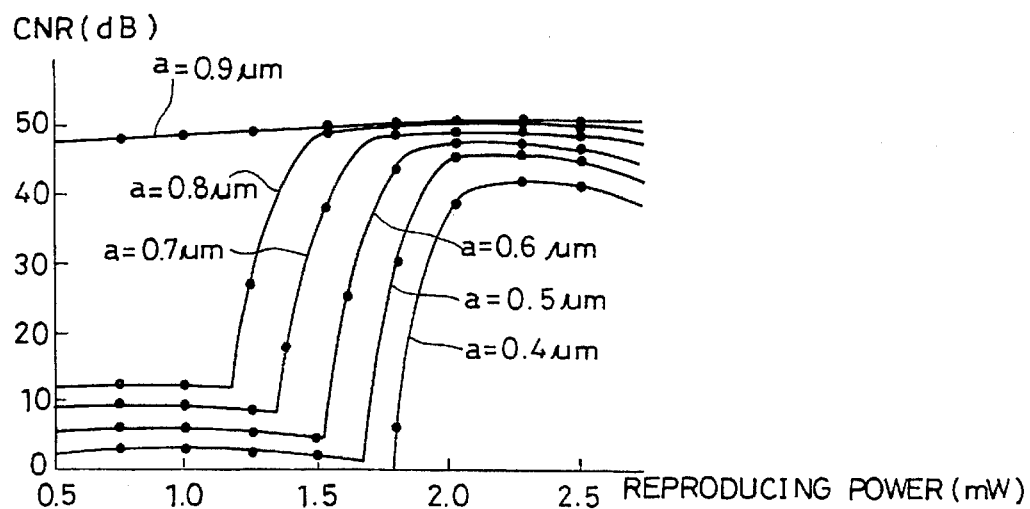

MAGNETO-OPTICAL RECORDING MEDIUM HAVING TWO REPRODUCTION LAYERS AND A METHOD FOR REPRODUCING THEREOF

FIELD OF THE INVENTION

The present invention relates to magneto-optical recording media, such as a magneto-optical disk, a magneto-optical tape, magneto-optical card that are applied to a magneto-optical recording apparatus, and relates to a reproducing method thereof.

BACKGROUND OF THE INVENTION

As a rewritable optical recording medium, a magneto-optical recording medium has practical application, but a conventional magneto-optical recording medium has an disadvantage such that its reproducing characteristics become worse as its recording bit diameter and recording bit gap become smaller than a beam diameter of a light beam to be irradiated. Such a disadvantage is due to that an adjacent recording bit comes into a converged light beam spot and thus respective recording bits cannot be reproduced separately.

In order to eliminate the above disadvantage, some announcements about a magneto-optically reproducing technique utilizing a magnetic super resolution phenomenon were made at MORIS '94. The abstracts of the announcements include No. 29-K-04 "MSR Disks with three Magnetic Layers Using In-Plane Magnetization Films" (p.125) and No. 29-K-05 "Magnetically-Induced Super Resolution Using Magneto-Static Coupling" (p. 126). In these abstracts, a magneto-optical recording medium in which an intermediate layer having in-plane magnetization or a non-magnetic intermediate layer is provided between a reproductive layer that are in-plane magnetization state at room temperature and that are in a perpendicular magnetization state at a higher temperature and a recording layer is used. As a result, a front mask and a rear mask in the in-plane magnetization state are formed, and a signal shows an abrupt change due to the rear mask.

In addition, No. 29-K-06 "New Readout Technique Using Domain Collapse on Magnetic Multilayer" (p. 127) disclosed that when satisfactory Jitter characteristics are obtained in an abrupt change in a signal due to the rear mask and when a reproductive signal is differentiated, a position of recording bits can be accurately detected.

In addition, the inventor makes a suggestion in connection with the magneto-optical reproducing technique utilizing the magnetic super resolution phenomenon as follows. FIG. 25 shows a schematic arrangement of the magneto-optical recording medium. As shown in FIG. 25, a substrate 71, a transparent dielectric layer 72, a reproductive layer 73, a non-magnetic intermediate layer 79, a recording layer 74, a protective layer 75, and an over coat layer 76 are laminated on a disk main body 200 in this order. The substrate 71 is made of a transparent base material, such as polycarbonate, and the substrate 71 has a disk shape.

The recording layer 74 has recording bits 201 and 202 to which digital information is recorded in perpendicular magnetization directions that are antiparallel. The recording bits 201 and 202 are magnetic domains used for recording information.

The reproductive layer 73 is provided on the recording layer 74 so as to have a reproductive bit on which a magnetization direction is transferred from the recording bits 201 and 202. The reproductive layer 73 is formed such that a compensation temperature of a perpendicular magnetization film of the reproductive layer 73 becomes closer to room temperature, saturation magnetization becomes strong at a higher temperature so as to become maximal in the vicinity of a reproducing temperature and that lowering of coercive force becomes less compared to increase in the saturation magnetization as the temperature rises from room temperature to the reproducing temperature. More specifically, a width of a stable magnetic domain, which can stably exist, in a reproducing bit becomes larger than a magnetic domain width 74a of the recording bits 201 and 202 at room temperature. Meanwhile, when the temperature of the reproductive layer 73 rises up to the reproducing temperature by a light beam 78 for detecting a magnetization direction of the reproductive bit, the stable magnetic domain width becomes smaller as the temperature rises so as to become smaller than the magnetic domain width 74a.

The non-magnetic intermediate layer 79 blocks magnetic moment of two magnetic ions, namely, exchange interaction that is magnetic coupling force for determining a relative direction of spinning between the recording layer 74 and the reproductive layer 73.

In accordance with the above arrangement, since the stable magnetic domain width of the reproducing bit on the reproductive layer 73 is larger than the magnetic width 74a of the recording bits 201 and 202 at room temperature, the reproducing bits cannot be exist with them having the same width as of the recording bits 201 and 202. Moreover, since the exchange interaction between the reproductive layer 73 and the recording layer 74 is blocked by the intermediate layer 74, the magnetization direction of the reproducing bit does not become same as that of the recording bits. When the converged light beam 78 is irradiated onto the reproductive layer 73, the reproductive layer 73 and the recording layer 74 have the same temperature distribution according to intensity distribution of the light beam 78 (approx. Gauss distribution). As the temperature rises, the stable magnetic domain width of the reproducing bit becomes small, and when the reproducing bit having a size corresponding to the recording bit 201 can exist stably, the reproducing bit 73a whose magnetization was reversed by a stray magnetic field 207 generated from the recording layer 74 is formed. At this time, since the magnetic coupling force between a reproducing bit 73b other than the reproducing bit 73a and the recording layer 74 is small, the reproducing bit 73b is separated from the reproducing 73a, and its magnetization direction becomes same as that of the recording bit due to an external magnetic field and the like.

Therefore, when the reproductive layer 73 is suitably set, the magnetization of only one portion of the domain to which the light beam 78 was irradiated can be reversed. For this reason, even if a size and gap of the recording bits 201 and 202 are decreased, the reproducing bits can be separated independently, thereby improving recording density of a magneto-optical recording medium. However, in the magneto-optical recording medium announced in the MORIS '94, the falling of the reproductive signal becomes abrupt due to the rear mask formed at the time of the reproduction, but the rising of the reproductive signal becomes gentle as the light beam moves and as the temperature rises like the conventional one. For this reason, the recording density of the magneto-optical recording medium cannot be sufficiently improved.

In addition, in the magneto-optical recording medium suggested by the inventor of the present invention, just when the temperature of the reproductive layer 73 rises and the stable magnetic domain width becomes smaller than the magnetic domain width of the recording bits 201 and 202, the reversed magnetic domain is instantaneously formed on the reproductive layer 73, and thus the rising of the reproductive signal becomes abrupt. However, since the temperature of the reproductive layer 73 is comparatively gently lowered, the falling of the reproductive layer becomes gentle. Therefore, the recording density of the magneto-optical recording medium cannot be sufficiently improved.

SUMMARY OF THE INVENTION

It is an object of the present invention to provide a magneto-optical recording medium and a magneto-optically reproducing method which are capable of realizing higher density recording.

In order to achieve the above object, a first magneto-optical recording medium according to the present invention has a recording layer having a recording magnetic domain where information is recorded in a perpendicular magnetization direction, a reproductive layer where its magnetization is reversed by a stray magnetic field generated from the recording magnetic domain, and an intermediate layer that is provided between the recording layer and the reproductive layer, and composed of a non-magnetic film or an in-plane magnetization film. The first magneto-optical recording medium is characterized by that the reproductive layer has (1) a first reproductive layer where a stable magnetic domain width is larger than a recording magnetic domain at room temperature and smaller than the recording magnetic domain width at a higher temperature than a first critical temperature, and (2) a second reproductive layer where a stable magnetic domain width is smaller than the recording magnetic domain width at room temperature and larger than the recording magnetic domain width at a higher temperature than a second critical temperature that is set higher than the first critical temperature.

In accordance with the above arrangement, the reproductive layer composed of the first reproductive layer and the second reproductive layer is separated from the recording layer by the intermediate layer composed of the non-magnetic film or the in-plane magnetization film, and thus exchange interaction between the reproductive layer and the recording layer is blocked. As a result, only magnetostatic coupling force acts between the recording layer and the reproductive layer due to the stray magnetic field, so even if coercive force of the reproductive layer is set to a smaller value, it is avoided that the magnetization direction of the reproductive layer is arranged in the magnetization direction of the recording layer at room temperature.

The first reproductive layer has a characteristic that its stable magnetic domain width is larger than the recording magnetic domain width at room temperature and is smaller at a higher temperature than the first critical temperature, namely, a characteristic that the magnetization is reversed at a higher temperature than the first critical temperature. The second reproductive layer has a characteristic that its stable magnetic domain width is smaller than the recording magnetic domain width at room temperature and the reversed magnetic domain is collapsed at a higher temperature than the second critical temperature. For this reason, the magnetization of the reproductive layer is not reversed by the stray magnetic field from the recording magnetic domain on a portion to which a light beam is not irradiated, and thus an reproductive output cannot be obtained. However, the magnetization of the reproductive layer is reversed by the stray magnetic field from the recording magnetic domain on a portion where its temperature is raised to a higher temperature than the first critical temperature by the light beam, and thus a reproductive output can be obtained.

In addition, the reversed magnetic domain that was reversed by the stray magnetic field from the recording magnetic domain is collapsed on a portion where its temperature is raised to a higher temperature than the second critical temperature. For this reason, when the magnetization direction, which is obtained such that the magnetization direction of the recording magnetic domain is transferred onto the reproductive layer by the rise in temperature by irradiation of the light beam, is detected, the magnetization direction of the recording magnetic domain is transferred onto only a portion where its temperature is higher than the first critical temperature and lower than the second critical temperature in a portion on which the light beam is irradiated.

Therefore, even in the case where the recording magnetic domain formed at a smaller pitch than the diameter of the light beam is reproduced by setting the reproductive layer suitably, since influence of adjacent recording magnetic domains extended on the light beam can be removed, a size and intervals of the recording magnetic domains in the recording layer can be further reduced than the conventional ones. As a result, it is possible to realize higher recording density required for larger capacity of a magneto-optical recording medium used for recording image information, etc.

A second magneto-optical recording medium of the present invention that is the first magneto-optical recording medium is characterized by that the recording layer has a first recording magnetic domain and a second recording magnetic domain whose perpendicular magnetization directions are antiparallel with each other, that the first recording magnetic domain width is smaller than the second recording magnetic domain width, that on the first reproductive layer, the stable magnetic domain width is larger than the first recording magnetic domain width at room temperature and is smaller than the first recording magnetic domain width at a higher temperature than the first critical temperature, and that on the second reproductive layer, the stable magnetic domain width is smaller than the first recording magnetic domain width at room temperature and is larger than the first recording magnetic domain width at a higher temperature than the second critical temperature.

In accordance with the above arrangement, the recording layer has the first recording magnetic domain and the second recording magnetic domain where information is recorded in the magnetization directions which are antiparallel with each other, and the first recording magnetic domain width is smaller than the second recording magnetic domain width. In this case, stray magnetic fields each having the same direction as each recorded magnetization direction are generated from the recording layer, but at room temperature, the reproductive layer is initialized in a direction where the total stray magnetic fields becomes stronger. In other words, the magnetization directions of the reproductive layer are arranged in the direction of the second recording magnetic domain.

For this reason, in the reproduction layer, the magnetization direction on a portion, which is other than the portion where the magnetization directions of the recording magnetic domains are transferred due to the irradiation of the light beam, can be arranged in the magnetization direction of the second magnetic domain without applying an external magnetic field.

As a result, since a magnetic field generating device for initialization is not necessary, miniaturization of the apparatus can be realized and a rise in cost can be decreased.

A first magneto-optical reproducing method of the present invention is characterized by having the step of previously manufacturing the first or the second magneto-optical recording medium, the step of raising the temperature of the reproductive layer so that it becomes higher than the second critical temperature by irradiating a light beam onto the reproductive layer while raising the temperature of the recording layer so that it becomes lower than a Curie temperature.

In accordance with the above method, since the temperature of the reproductive layer is raised to a higher temperature than the second critical temperature by the light beam, the reversed magnetic domain on the reproductive layer can be generated and collapsed. Moreover, since the recording layer is not heated not lower than the Curie temperature, the stray magnetic field is generated from the recording magnetic domain of the recording layer, and thus it is possible to transfer the magnetization direction of the recording magnetic domain onto the reproductive layer.

A second magneto-optical reproducing method of the present invention is characterized by having the step of previously manufacturing the first magneto-optical recording medium and the step of initializing the magnetization of the reproductive layer by an external magnetic field.

In accordance with the above method, the magnetization direction of the reproductive layer is initialized by the external magnetic field. For this reason, when the temperature of the reproductive layer is raised by the light beam and the magnetization direction of the recording magnetic domain is transferred onto a corresponding reproductive magnetic domain, influence of a magnetization direction of another reproductive magnetic domain can be reduced, thereby making it possible to detect the transferred magnetization direction stably.

A third magneto-optical reproducing method of the present invention is characterized by having the step of previously manufacturing the first magneto-optical recording medium and the step of differentially processing a reproductive signal obtained by irradiating a light beam onto a reproductive layer.

In accordance with the above method, since the differentially processed signal of the reproductive signal obtained by irradiating the light beam onto the reproductive layer is used as a signal for reproducing information, a position of the recording magnetic domain can be detected more accurately. As a result, a magneto-optical recording medium with larger capacity and higher density can be realized.

For fuller understanding of the nature and advantages of the invention, reference should be made to the ensuing detailed description taken in conjunction with the accompanying drawings.

BRIEF DESCRIPTION OF THE DRAWINGS

FIG. 3(a) is an explanatory drawing which shows a schematic arrangement of a recording magnetic domain; FIGS. 3(b) and 3(c) are explanatory drawings which show reproductive signal waveforms; and FIG. 3(d) is an explanatory drawing which shows generation of a reversed magnetic domain.

FIG. 4 is a graph which shows a temperature dependency of coercive force of a second reproductive layer.

FIG. 5 is a graph which shows a temperature dependency of a stable magnetic domain width of the second reproductive layer.

FIG. 15(a) is a plan view which shows a recording track; and FIG. 15(b) is a cross-sectional view which shows the recording track.

FIG. 16(a) is a plan view which shows a recording track; and FIG. 16(b) is a cross-sectional view which shows the recording track.

FIG. 17 is a graph which shows a reproducing power dependency of CNR of the magneto-optical recording medium on which recording is carried out by the method of FIG. 16.

DETAILED DESCRIPTION OF THE PREFERRED EMBODIMENTS

[EMBODIMENT 1]

Figure 1:
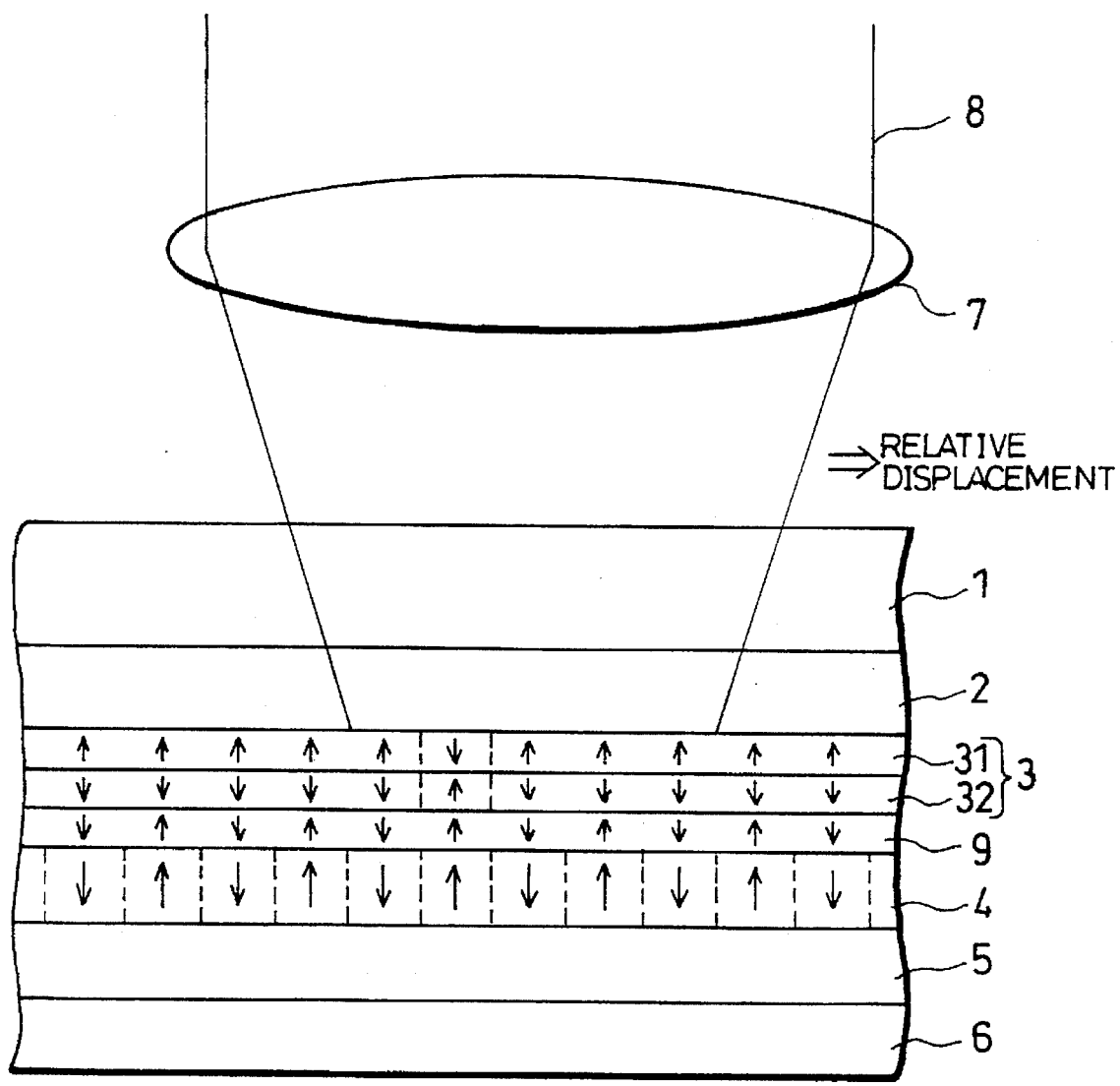
FIG. 1 is an explanatory drawing which shows a schematic arrangement of a magneto-optical recording medium according to one embodiment of the present invention.

FIG. 1 shows a schematic arrangement of a magneto-optical disk as the magneto-optical recording medium of the present embodiment. The magneto-optical disk is arranged such that a substrate 1, a transparent dielectric layer 2, a reproductive layer 3 composed of a first reproductive layer 31 and a second reproductive layer 32, a non-magnetic intermediate layer 9, a recording layer 4, a protective layer 5 and an over coat layer 6 are laminated in this order. A light beam 8 is converged on the first reproductive layer 31 and the second reproductive layer 32 by an objective lens 7 so that recording/reproducing is carried out.

In the magneto-optical disk of the present embodiment, the width of a magnetic domain, which can stably exist on the first reproductive layer 31 and the second reproductive layer 32, is controlled according to temperature distribution generated by the converged light beam 8, and a magnetic domain is instantaneously generated and collapsed. For this reason, as shown in FIG. 1, only one portion of the reproductive layers 31 and 32 on which the light beam 8 is irradiated is reversed according to a stray magnetic field generated from a recording magnetic domain. Therefore, a recording magnetic domain, which was formed at smaller pitch than a beam diameter of the converged light beam 8, can be also reproduced.

Figure 2:
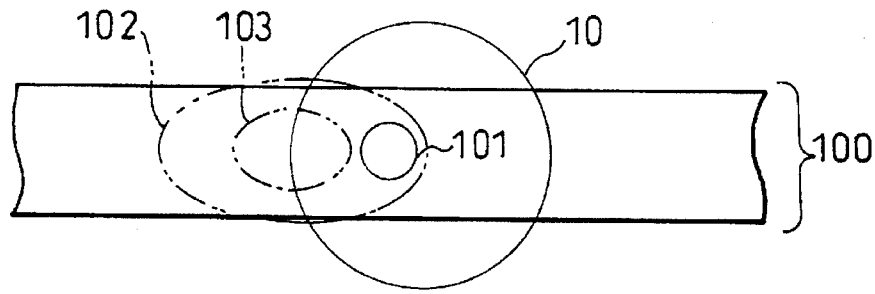
FIGS. 2(a) through 2(d) are explanatory drawings which show a reproducing principle of the magneto-optical recording medium of the present invention.
Figure 2:
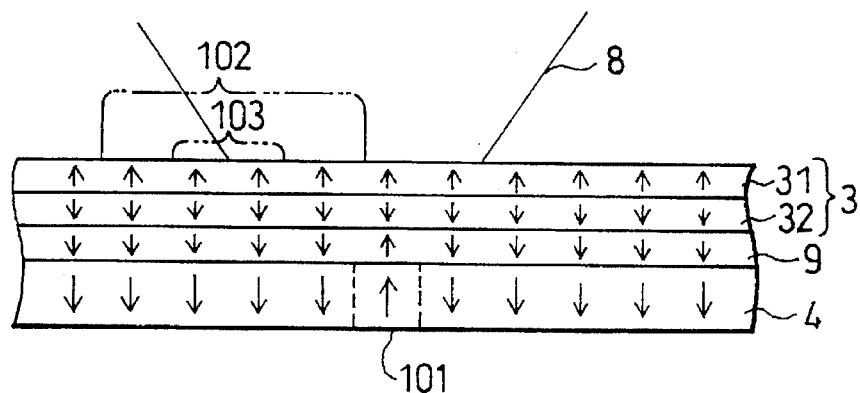
Figure 2:
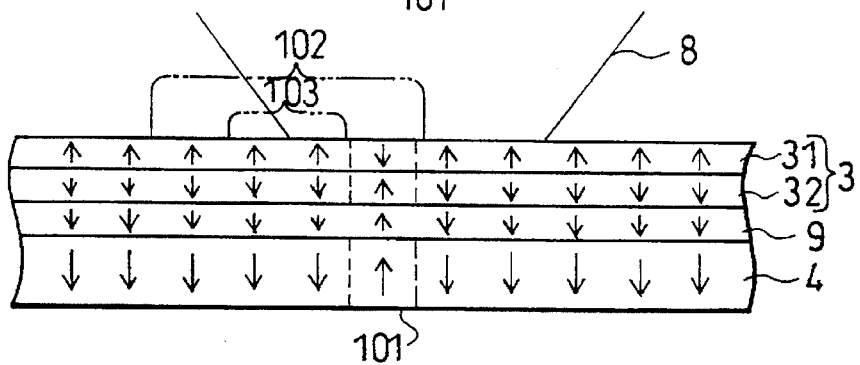
Figure 2:
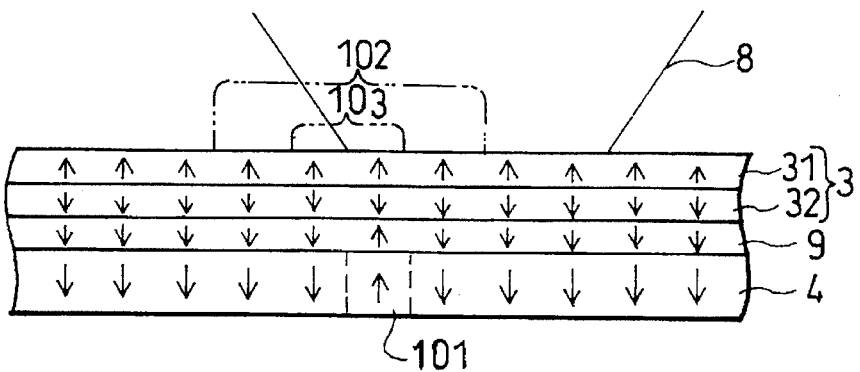

The following further details the reproducing method in reference to FIGS. 2(a) through 2(d). FIG. 2(a) is a top view of the magneto-optical disk of the present embodiment. In the magneto-optical disk, its recording magnetic domains are usually formed along a track on the recording layer according to recording information, but here, for clear explanation of reproducing characteristics, only one recording magnetic domain is formed.

The light beam 8 relatively moves along a track 100 formed on the substrate 1. As the light beam 8 moves, a light beam spot 10 moves accordingly, and according to its moving speed, the magneto-optical disk has temperature distribution. Isotherms 102 and 103 show the temperature distribution. When the light beam 8 moves, a portion where the temperature of the magneto-optical disk becomes highest is positioned behind the light beam spot 10. The isotherm 102 shows a first critical temperature at which the stable magnetic domain width of the first reproductive layer 31 becomes same as the recording magnetic domain width of the recording layer 4, and the isotherm 103 shows a second critical temperature at which the reversed magnetic domain of the second reproductive layer 32 is collapsed.

FIG. 2(b) shows a state before a recording magnetic domain 101 enter the isotherm 102. In this state, the magnetization of the second reproductive layer 32 can be reversed. However, since the temperature of the first reproductive layer 31 is lower than the first critical temperature, the width of the magnetic domain that can stably exist on the first reproductive layer 31 is larger than the recording magnetic domain width, and thus the magnetization of the first reproductive layer 31 is not reversed according to the recording magnetic domain 101. Therefore, the magnetizations of the reproductive layers 31 and 32 are not reversed.

Next, FIG. 2(c) shows a state before the isotherm 103 passes the recording magnetic domain 101 after the light beam spot 10 moves and the isotherm 102 passes the recording magnetic domain 101. At this time, the temperature of a reproductive layer 3 on the recording magnetic domain 101 is higher than the first critical temperature and is lower than the second critical temperature. Therefore, the width of the magnetic domain that can stably exist on the first reproductive layer 31 becomes smaller than the recording magnetic domain width, and thus the magnetization of the reproductive layer 3 is reversed according to the recording magnetic domain 101. Since the magnetization is instantaneously reversed Just when the stable magnetic domain width of the first reproductive layer 31 becomes smaller than the width of the recording magnetic domain 101, the rising of the reproductive signal is abrupt.

Next, FIG. 2(d) shows a state that the isotherm 103 passes the recording magnetic domain 101. In this state, the width of the magnetic domain that stably exist on the second reproductive layer 32 becomes larger than the recording magnetic domain width, and thus a reversed magnetic domain on the second reproductive layer 32 is collapsed. The reversed magnetic domain is instantaneously collapsed just when the stable magnetic domain width of the second reproductive layer 32 becomes larger than the width of the recording magnetic domain 101, so the falling of the reproductive signal becomes abrupt.

According to the above description, it is clear that the magnetic domain corresponding to the recording magnetic domain 101 can stably exist on the reproductive layer only when the temperature of the reproductive layer 3 is higher than the first critical temperature and is lower than the second critical temperature.

FIG. 3(a) shows a recording magnetic domain 104 having different lengths. FIG. 3(b) shows a reproductive signal waveform obtained in the conventional magneto-optical recording medium of MORIS '94, 29-K-05 and 29-K-06, and the falling of a reproductive signal becomes abrupt due to instantaneous collapse of the magnetic domain of the reproductive layer 3. Position information can be accurately detected on a portion where the falling of the signal is abrupt, but on the rising portion of the reproductive signal, the signal changes gently due to the move of the light beam like conventional one.

Meanwhile, in the magneto-optical disk of the present embodiment, the reproductive layer 3 is composed of the first reproductive layer 31 and the second reproductive layer 32. Since the instantaneous generation and collapse of the magnetic domain on the reproductive layer are utilized, as shown in FIG. 3(d), Just when the light beam reaches the recording magnetic domain 104, the reversed magnetic domain is instantaneously generated on the first reproductive layer 31 (105), and just when the light beam leaves the recording magnetic domain 104, the reversed magnetic domain is instantaneously collapsed on the second reproductive layer 32 (106) due to the move of the light beam 107. For this reason, as shown in FIG. 3(c), the rising and falling of the reproductive signal waveform are abrupt.

In the present embodiment, the reproductive signal having abrupt rising and falling can be obtained, thereby making it possible to detect accurate position information. Moreover, higher density recording than conventional arts can be realized.

The following describes a method for forming the magneto-optical disk having the above arrangement.

First, in a sputtering device provided with four targets each made of Al, first GdFeCo alloy, second GdFeCo alloy and DyFeCo alloy, the substrate 1 made of polycarbonate having a pre-groove and a pre-pit is positioned in a substrate holder. After the sputtering device is evacuated to $1 \times 10^{-6}$ Torr, mixed gas of argon and nitrogen is put thereinto. Electric power is supplied to the Al target, and the transparent dielectric layer 2 made of AlN is formed on the substrate 1 under the condition of gas pressure of $4 \times 10^{-3}$ Torr.

In order to improve the reproducing characteristics, the thickness of the transparent dielectric layer 2 is set to about a value obtained by dividing ¼ of the wavelength of the reproduced light by its refractive index. If the wavelength of the reproduced light is 680 nm, the film thickness is about 10 nm–80 nm. In the present embodiment, the thickness of the transparent dielectric layer 2 was 50 nm.

Next, after the sputtering device was evacuated to $1\times10^{-6}$ Torr again, argon gas was put thereinto, and electric power was supplied to the first GdFeCo alloy target so that the first reproductive layer 31 made of $Gd_{0.18}(Fe_{0.66}Co_{0.34})_{0.82}$ was formed under the condition of gas pressure of $4\times10^{-3}$Torr. The first reproductive layer 31 has TM-rich composition where a ratio of TM (transition) metal to RE (rare earth) metal is larger than that of its compensation composition at room temperature. Therefore, the first reproductive layer 31 has compensation temperature that is approximately room temperature, and its Curie point is 420° C.

Since magnetization information recorded in the recording layer 4 should be prevented from appearing as a signal output to some degree, it is desirable that the thickness of the first reproductive layer 31 is not less than 10 nm. Moreover, if the first reproductive layer 31 becomes too thick, the light beam power required for the rise in temperature becomes strong, and recording sensitivity is deteriorated. For this reason, it is desirable that the thickness of the first reproductive layer 31 is not more than 50 nm. In the present embodiment, the film thickness was 20 nm.

Next, electric power was supplied to the second GdFeCo alloy target, and the second reproductive layer 32 made of $Gd_{0.31}(Fe_{0.66}Co_{0.34})_{0.69}$ was formed under the condition of gas pressure of $4\times10^{-3}$Torr. The second reproductive layer 32 has RE-rich composition where a ratio of TM (transition) metal to RE (rare earth) metal is smaller than that of its compensation composition, and its Curie temperature is 420° C.

Since the magnetization information recorded in the recording layer 4 should be prevented from appearing as a signal output to some degree, it is desirable that the thickness of the second reproductive layer 32 is not less than 10 nm. Moreover, if the second reproductive layer 32 becomes too thick, the light beam power required for the rise in temperature becomes strong, and recording sensitivity is deteriorated. For this reason, it is desirable that the thickness of the second reproductive layer 32 is not more than 50 nm. In the present embodiment, the film thickness was 20 nm.

Next, mixed gas of argon and nitrogen was put into the sputtering device, and electric power was supplied to the Al target so that the non-magnetic intermediate layer 9 made of AlN was formed on the substrate 1 under the condition of gas pressure of $4\times10^{-3}$Torr. It is desirable that the thickness of the non-magnetic intermediate layer 9 is not more than 60 nm in order to effectively supply the stray magnetic field generated from the recording layer 4 to the reproductive layer 3. Moreover, It is desirable that film thickness is not less than 1 nm so that the magnetic exchange coupling force does not exist between the first reproductive layer 31 and the recording layer 4 and between the second reproductive layer 32 and the recording layer 4. In the present embodiment, the thickness of the non-magnetic intermediate layer 9 was 5 nm.

After the sputtering device was evacuated to $1\times10^{-6}$Torr again, argon gas was put thereinto and electric power was supplied to the DyFeCo target so that the recording layer 4 composed of $Dy_{0.23}(Fe_{0.75}Co_{0.25})_{0.77}$ was formed under the same condition as that of the reproductive layer 3 composed of GdFeCo. The recording layer 4 is a perpendicular magnetization film having a compensation point that is approximately room temperature, and its Curie temperature was 250° C.

Since a stray magnetic field required for the reverse of the magnetization of the reproductive layer 3 should be generated, it is desirable that the thickness of the recording layer 4 is not less than 20 nm. Moreover, if the recording layer 4 becomes too thick, the light beam power required for the rise in the temperature becomes strong, and recording sensitivity is deteriorated. For this reason, it is desirable that the thickness of the recording layer 4 is not more than 200 nm. In the present embodiment, the thickness of the recording layer 4 was 60 nm.

Next, mixed gas of argon and nitrogen was put into the sputtering device, and electric power was supplied to the Al target so that the protective layer 5 made of AlN was formed under the same condition as that of the transparent dielectric layer 2. The thickness of the protective layer 5 may obtain any value as long as it can protect the magnetic layer against corrosion, such as oxidation, so it is desirable that the thickness is not less than 5 nm. In the present embodiment, the thickness of the protective layer 5 was 20 nm. Then, Ultraviolet (UV) hardening resin or thermohardening resin is applied to the protective layer 5 by a spin coat, and UV rays are irradiated thereonto or the protective layer 5 to which thermohardening resin was applied is heated so that the over coat layer 6 is formed.

FIG. 4 shows temperature dependency of coercive force of a sample having only the second reproductive layer 32 and the protective layer 5. FIG. 5 shows temperature dependency of the width of its stable magnetic domain. According to these drawings, it is clear that as the temperature rises, the coercive force and the stable magnetic domain width become larger, and when the temperature rises to 200° C., the stable magnetic domain width become about 0.5 µm. Therefore, the magnetic domain having the width of 0.5 µm exists stably at room temperature but does not exist stably at a temperature of not lower than 200° C.

Figure 6:
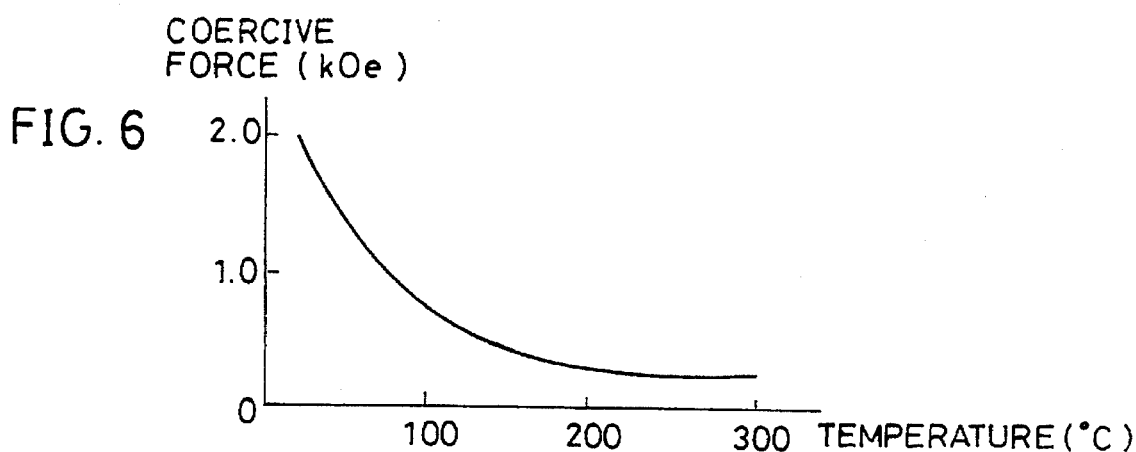
FIG. 6 is a graph which shows a temperature dependency of coercive force of a first reproductive layer.
Figure 7:
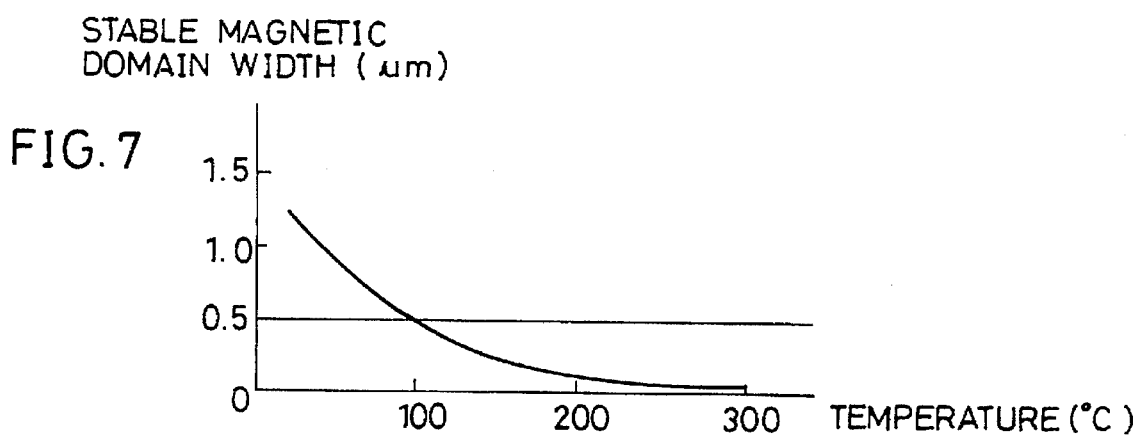
FIG. 7 is a graph which shows a temperature dependency of a stable magnetic domain width of the first reproductive layer.

Next, FIG. 6 shows temperature dependency of coercive force of a sample having only the first reproductive layer 31 and the protective layer 5. FIG. 7 shows temperature dependency of the width of its stable magnetic domain. According to these drawings, it is clear that the coercive force and the stable magnetic domain width become smaller as the temperature rises, and when the temperature becomes 100° C, the stable magnetic domain width becomes about 0.5 µm. Therefore, the magnetic domain having the width of 0.5 µm does not exist stably at room temperature but exists stably at a temperature of not lower than 100° C.

Therefore, in the case where the width of the recording magnetic domain is 0.5 µm, the first critical temperature and the second critical temperature are respectively 100° C. and 200° C., and in the case where the first reproductive layer 31 and the second reproductive layer 32 are laminated, magnetization is reversed due to the stray magnetic field generated from the recording layer 4 only in the temperature range of 100° C.–200° C.

Figure 8:
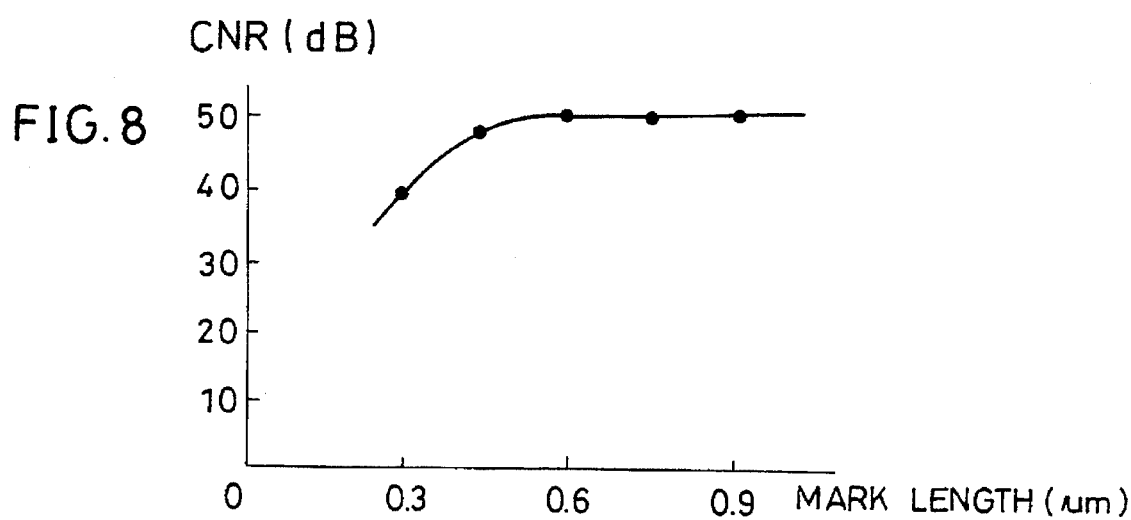
FIG. 8 is a graph which shows a mark length dependency of CNR of the first embodiment.

Next, the recording/reproducing characteristics of the magneto-optical disk were examined. FIG. 8 shows mark length dependency of CNR (carrier-to-noise ratio) in the magneto-optical disk of the present embodiment. After the magnetization directions of the first reproductive layer 31, the second reproductive layer 32 and the recording layer 4 were initialized, a laser beam of 6 mW was pulsatively irradiated on the magneto-optical disk at linear velocity of 5 m/s and the recording magnetic field becomes 10 kA/m. Then, recording bits each having different mark lengths were formed at a pitch twice the mark length, and the CNR was measured by a reproducing laser power of 2mW. Since the non-magnetic intermediate layer 9 exists, the magnetic exchange coupling force does not exist between the second reproductive layer 32 and the recording layer 4, and thus recording can be carried out in a weak recording magnetic field of about 10 kA/m similarly to the case of the recording layer 4 that is a monolayer.

According to FIG. 8, it is clear that the magneto-optical disk of the present embodiment, the CNR of 40 dB is obtained in the recording bit having the mark length of 0.3 μm and the mark pitch of 0.6 μm. The CNR was measured by an optical system using a laser having the wavelength of 830 nm, but under this condition, a recording bit to be reproduced cannot be separated from adjacent recording bits at all in the conventional magneto-optical disks. In other words, the CNR of the bit, that was recorded when its mark length was 0.3 μm and mark pitch was 0.6 μm, becomes 0. In the present embodiment, since the magnetic super resolution phenomenon intervened in the reproduction on the magneto-optical disk, the CNR of 40 dB could be obtained as mentioned above.

Figure 9:
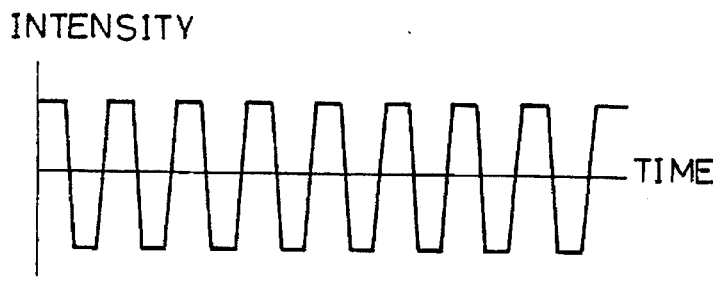
FIG. 9 is an explanatory drawing which shows a reproductive signal.

FIG. 9 shows a reproductive signal waveform obtained from a magnetic domain where the recording bit having the mark length of 0.3 μm and mark pitch was 0.6 μm was recorded. A rectangular reproductive waveform that is a characteristic of the present invention could be obtained.

Figure 10:
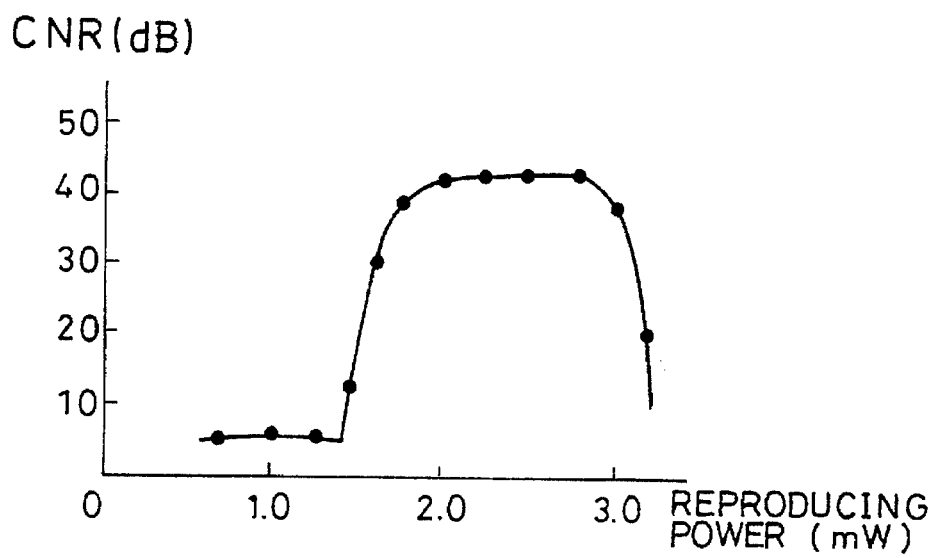
FIG. 10 is a graph which shows a reproducing power dependency of the CNR.

FIG. 10 shows a reproducing power dependency of the CNR of the recording bit having the mark length of 0.3 μm and mark pitch of 0.6 μm. The CNR abruptly increases when the reproducing power obtains a certain value (about 1.5 mW). In other words, when the reproducing power rises, the reproductive layer 3 has temperature distribution shown in FIG. 2. As a result, a reversed magnetic domain is instantaneously generated on the first reproductive layer 31 and a reversed magnetic domain is instantaneously collapsed on the second reproductive layer 32.

When the reproducing power is further increased, the CNR is abruptly lowered. This is because when the temperature of the recording layer 4 rises to the proximity of its Curie temperature, the stray magnetic field generated from the recording layer 4 becomes small, and thus the recording magnetic domain cannot be satisfactorily transferred. In the magneto-optical disk of the present embodiment, the reproducing power should be controlled so as to be larger than a value at which a reversed magnetic domain can be generated and collapsed, and so as to be smaller than a value at which the recording magnetic domain cannot be satisfactorily transferred.

The thicknesses of the first reproductive layer 31, the second reproductive layer 32, the non-magnetic intermediate layer 9 and the recording layer 4 were changed, and the CNR of the recording bit with the mark length of 0.3 μm and mark pitch of 0.6 μm was measured. The results are shown in TABLE 1. The CNR was measured by an optical system using a laser of wavelength of 830 nm. The recording bit with the mark length of 0.3 μm and mark pitch of 0.6 μm obtains the CNR of any value under the above condition. This signifies that the magnetic super resolution phenomenon intervenes in the reproduction on the magneto-optical disk.

In TABLE 1, a disk which obtained the same rectangular reproductive waveform as the reproductive waveform shown in FIG. 3(c) is identified by marking the column "reproducing characteristic" with "o". It was confirmed that in the thickness range of the present embodiment, a difference in the CNR exists, but the magnetic super resolution phenomenon intervened in the reproducing operation of all the disks.

TABLE 1

| First reproductive layer (nm) | Second reproductive layer (nm) | Intermediate layer (nm) | Recording layer (nm) | CNR (dB) | Reproductive characteristic |
|---|---|---|---|---|---|
| 5 | 5 | 5 | 40 | 15 | o |
| 10 | 10 | 5 | 40 | 37 | o |
| 20 | 20 | 5 | 40 | 39 | o |
| 30 | 30 | 5 | 40 | 40 | o |
| 40 | 40 | 5 | 40 | 39 | o |
| 50 | 50 | 5 | 40 | 37 | o |
| 60 | 60 | 5 | 40 | 39 | o |
| 20 | 20 | 1 | 40 | 39 | o |
| 20 | 20 | 2 | 40 | 40 | o |
| 20 | 20 | 5 | 40 | 40 | o |
| 20 | 20 | 10 | 40 | 39 | o |
| 20 | 20 | 20 | 40 | 36 | o |
| 20 | 20 | 40 | 40 | 32 | o |
| 20 | 20 | 60 | 40 | 30 | o |
| 20 | 20 | 5 | 5 | 18 | o |
| 20 | 20 | 5 | 10 | 25 | o |
| 20 | 20 | 5 | 20 | 35 | o |
| 20 | 20 | 5 | 30 | 39 | o |
| 20 | 20 | 5 | 40 | 40 | o |
| 20 | 20 | 5 | 60 | 40 | o |
| 20 | 20 | 5 | 80 | 40 | o |
| 20 | 20 | 5 | 120 | 39 | o |

Next, TABLE 2 shows results of examining the CNR of the recording bit having the mark length of 0.3 μm and the mark pitch of 0.6 μm when the composition of the first reproductive layer 31 and the second reproductive layer 32 was changed. In TABLE 2, X1 and Y1 represent a composition ratio of $Gd_{X1}(Fe_{Y1}Co_{1-Y1})_{-X1}$ of the first reproductive layer 31, and X2 and Y2 represent a composition ratio of $Gd_{X2}(Fe_{Y2}Co_{1-Y2})_{1-X2}$ of the second reproductive layer 32. The CNR was measured by an optical system using a laser having a wavelength of 830 nm.

In TABLE 2, disks which obtained the same rectangular reproductive waveforms the reproductive waveform shown in FIG. 3(c), i.e. disks, where it is confirmed that the magnetic super resolution phenomenon intervened in the reproducing operation, are identified by marking the column "reproducing characteristic" with "o".

TABLE 2

| X1 | Y1 | X2 | Y2 | CNR (dB) | Reproducing characteristic |
|---|---|---|---|---|---|
| 0.12 | 0.66 | 0.31 | 0.66 | 0 | — |
| 0.14 | 0.66 | 0.31 | 0.66 | 31.2 | o |
| 0.18 | 0.66 | 0.31 | 0.66 | 40.0 | o |
| 0.24 | 0.66 | 0.31 | 0.66 | 38.2 | o |
| 0.26 | 0.66 | 0.31 | 0.66 | 0 | — |
| 0.18 | 0.66 | 0.27 | 0.66 | 0 | — |
| 0.18 | 0.66 | 0.29 | 0.66 | 33.2 | o |
| 0.18 | 0.66 | 0.31 | 0.66 | 39.0 | o |
| 0.18 | 0.66 | 0.34 | 0.66 | 34.5 | o |
| 0.18 | 0.66 | 0.36 | 0.66 | 0 | — |
| 0.10 | 0.80 | 0.33 | 0.80 | 0 | — |
| 0.12 | 0.80 | 0.33 | 0.80 | 22.5 | o |
| 0.15 | 0.80 | 0.33 | 0.80 | 35.5 | o |
| 0.18 | 0.80 | 0.33 | 0.80 | 40.0 | o |
| 0.22 | 0.80 | 0.33 | 0.80 | 28.9 | o |
| 0.24 | 0.80 | 0.33 | 0.80 | 0 | — |
| 0.18 | 0.80 | 0.29 | 0.80 | 0 | — |
| 0.18 | 0.80 | 0.31 | 0.80 | 33.3 | o |
| 0.18 | 0.80 | 0.35 | 0.80 | 0.0 | o |
| 0.18 | 0.80 | 0.38 | 0.80 | 39.5 | o |
| 0.18 | 0.80 | 0.40 | 0.80 | 0 | — |

According to TABLE 2, when Y1=0.66 and Y2=0.66, a relationship: $0.14 \leq X1 \leq 0.24$ and a relationship: $0.29 \leq X2 \leq 0.34$ should be fulfilled. If X1 becomes too small, a micro-magnetic domain of the reproductive layer exists stably at room temperature. For this reason, the magnetic super resolution operation cannot be obtained. Moreover, if X1 becomes too large, the stabilization of the micro-magnetic domain due to the rise in temperature does not occur. For this reason, the magnetic super resolution operation cannot be obtained. Moreover, if X2 becomes too small, the micro-magnetic domain does not stably exist in any temperature range. For this reason, the magnetic super resolution operation cannot be obtained. If X2 becomes too large, collapse of the micro-magnetic domain due to the rise in temperature does not occur. Therefore, the magnetic super resolution operation cannot be obtained.

In addition, when Y1=0.80 and Y2=0.80, the relationship: $0.12 \leq X1 \leq 0.22$ and the relationship: $0.31 \leq X2 \leq 0.38$ should be fulfilled for the same reason as the above. In other words, the range of X1 and X2 changes with the values of Y1 and Y2.

In the present embodiment, the transparent dielectric layer 2 is explained in reference to AlN, but the transparent dielectrics, such as SiN, MgO, SiO and TaO, can be used. However, since a rare earth transition metal alloy thin film which composes the reproductive layer 3 and the recording layer 4 is apt to be oxidized, it is desirable that AlN and SiN that do not contain oxygen are used as the transparent dielectric layer 2.

In addition, in the present embodiment, GdFeCo was used as the reproductive layer 3, but the reproductive layer 3 is not necessarily limited to GdFeCo as long as it is made of a material where the stable magnetic domain width changes depending on a change in temperature. For example, rare earth transition metal alloy thin films, such as GdFe, GdDyFe and GdDyFeCo, can be used.

In addition, in the present embodiment, AlN was used as the non-magnetic intermediate layer 9, but any material is allowable as long as the material does not show magnetism. Therefore, metal, such as Al, Si, Ta and Ti, and dielectrics, such as SiN, SiO and TaO, can be used besides AlN. More specifically, it is desirable that metal, such as Al, Si, Ta and Ti, or AlN or SiN, which does not contain oxygen is used similarly to the case of the transparent dielectric layer 2. Moreover, when AlN is used as the transparent dielectric layer 2, Al or AlN is used as the non-magnetic intermediate layer 9, and when SiN is used as the transparent dielectric layer 2, Si or SiN is used as the non-magnetic intermediate layer 9. As a result, an additional target for sputtering is not required for forming the non-magnetic intermediate layer 9.

In addition, the non-magnetic intermediate layer 9 can adopts any material as long as it can cancel the exchange coupling force between the recording layer 4 and the reproductive layer 3, so an in-plane magnetization film composed of GdFeCo, GdFe or FeCo can be used as the non-magnetic intermediate layer 9.

Next, in the present embodiment, DyFeCo is described as an example of the recording layer 4, but any material is allowable as long as it can generate a stray magnetic field required for the reverse of magnetization of the reproductive layer 3. Therefore, a rare earth transition metal alloy thin film, such as TbFeCo, TbDyFeCo and GdTbFeCo, can be used besides DyFeCo.

In addition, positions of the first reproductive layer 31 and the second reproductive layer 32 can be exchanged. In this case, the same effects as those of the above-mentioned magneto-optical disk of the present embodiment can be obtained.

[EMBODIMENT 2]

The following describes a reproducing method of a magneto-optical disk of the present embodiment. Here, the arrangement of the magneto-optical disk is same as that shown in FIG. 1.

It is desirable that in the reproducing method of the present embodiment, the magnetization directions on the portion of the reproductive layer 3 where a light beam is not irradiated are previously arranged in one direction.

Since the exchange coupling force acts between the first reproductive layer 31 and the second reproductive layer 32 at room temperature, in FIGS. 1 and 2(a) through 2(d), the magnetization direction of the first reproductive layer 31 becomes opposite to that of the second reproductive layer 32 in the initial state. If the first reproductive layer 31 has the TM-rich composition, the second reproductive layer 32 has the RE-rich composition. In this case, the initializing direction of the reproductive layer 3 is determined by the reproductive layer having the RE-rich composition where the magnetization is comparatively strong at room temperature.

Figure 11:
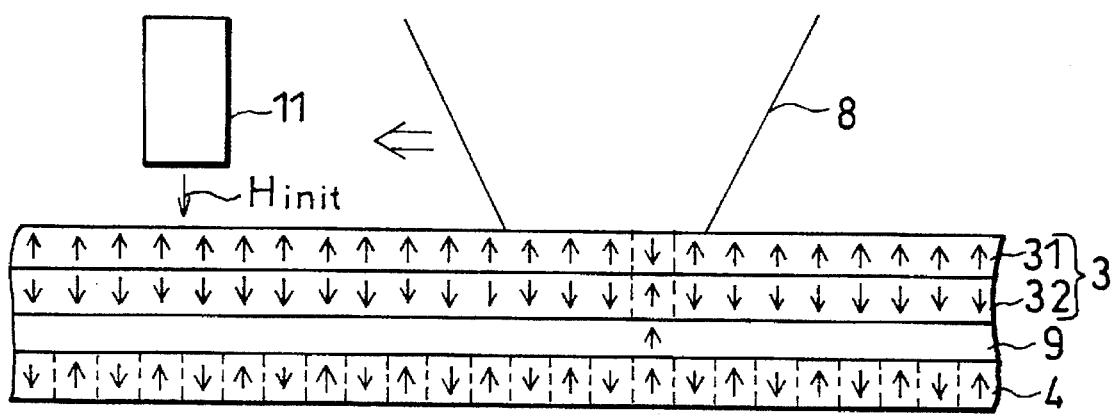
FIG. 11 is an explanatory drawing which shows a reproducing method.

FIG. 11 explains a method for arranging the magnetization direction of the reproductive layer 3 in one direction using an initializing magnet 11 prior to reproduction.

An initializing magnetic field $H_{init}$, that is stronger than the coercive force of the second reproductive layer 32 having the RE-rich composition and is weaker than the coercive force of the recording layer 4, is applied to the reproductive layer 3 from the initializing magnet 11 at room temperature, and thus the magnetization direction of the reproductive layer 3 can be arranged in one direction. Since the stable magnetic domain width of the first reproductive layer 31 is set so as to become larger than the recording magnetic domain width at room temperature, the magnetization of the first reproductive layer 31 is not reversed until the temperature is raised by the light beam 8 and thus the stable magnetic domain width becomes smaller than the recording magnetic domain width. In such a manner, when the magnetization direction on the target portion of the reproductive layer 3 is initialized, an influence of the magnetization direction on the other portion of the reproductive layer 3 can be decreased. For this reason, the composition range of the reproductive layer 3 for realizing the magnetic super resolution phenomenon can be enlarged further than the embodiment 1.

Figure 12:
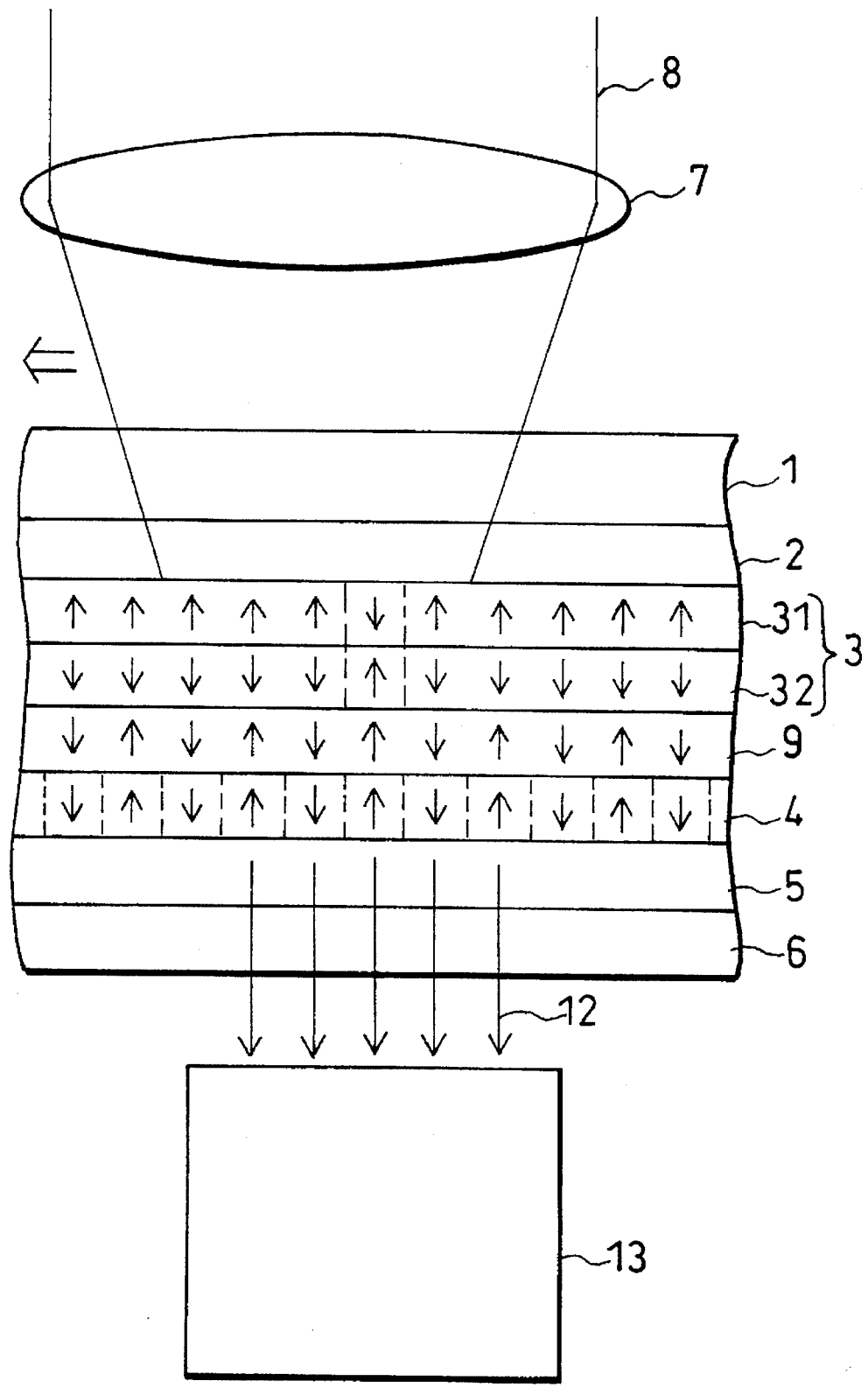
FIG. 12 is an explanatory drawing which shows another reproducing method.

FIG. 12 explains a method using a reproductive magnetic field generating unit 13. The reproductive magnetic field generating unit 13 is positioned on the rear side of the recording layer 4, and a reproductive magnetic field 12 is applied to the reproductive layer 3 by the reproductive magnetic field generating unit 13 so that the reproductive layer 3 is initialized. On a portion of the first reproductive layer 31 where the temperature is raised by the light beam 8 and thus the stable magnetic domain width becomes narrower, the magnetization is reversed by the stray magnetic field generated from the recording layer 4. Meanwhile, a portion of the first reproductive layer 31 where the temperature is not raised always has magnetization in one direction due to the reproductive magnetic field 12. In this case, the composition range of the reproductive layer 3 for realizing the magnetic super resolution phenomenon can be further enlarged than that in the embodiment 1 similarly to the case where the initializing magnet 11 is used. Moreover, when the reproductive magnetic field generating unit 13 is also used as means for generating the recording magnetic field, the present invention can be realized without large-sizing and raising costs of the apparatus.

Figure 13:
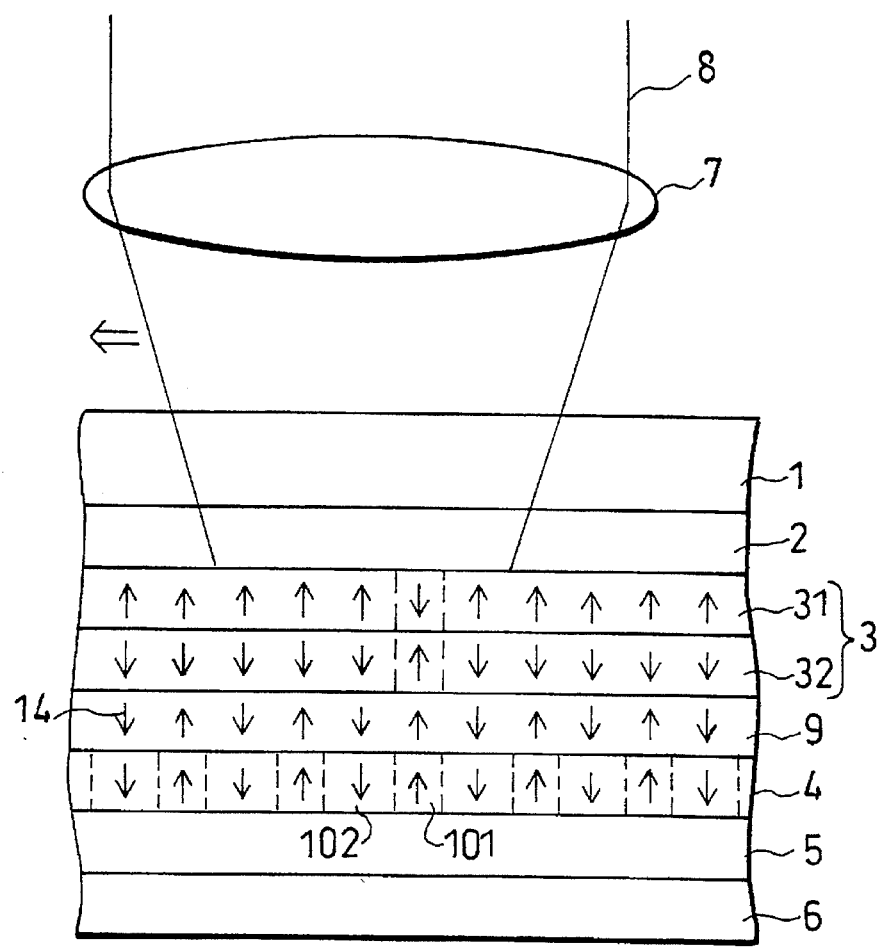
FIG. 13 is an explanatory drawing which shows still another reproducing method.

In addition, the reproductive layer 3 can be initialized by the stray magnetic field 14 generated from the recording layer 4. FIG. 13 is its explanatory drawing. The stray magnetic field 14 having the same magnetization direction as the recorded one is generated from the recording layer 4, but at room temperature, it is difficult for the magnetization of the reproductive layer 3 to be reversed according to the stray magnetic field generated from the recording magnetic domain whose width is narrower. The reproductive layer 3 is initialized in the direction where the total stray magnetic field 14 relatively becomes larger in the end. In other words, the magnetization direction of the reproductive layer 3 is adjusted to the magnetization direction having a wider area on the recording layer 4.

Therefore, in the case where a first recording magnetic domain 101 and a second recording magnetic domain 102 are formed on the recording layer 4, the recording layer 4 is set so that a non-recording portion (the second recording magnetic domain 102) becomes relatively larger than a recording portion (the first recording magnetic domain 101). As a result, the reproductive layer 3 can be initialized by the stray magnetic field 14.

Figure 14A:
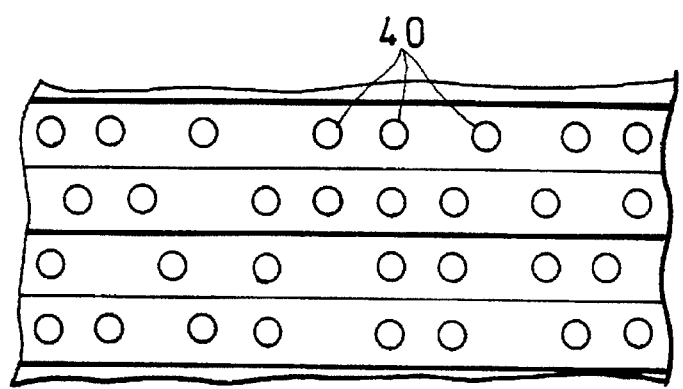
FIG. 14(a) is a plan view which shows a recording track.
Figure 14B:
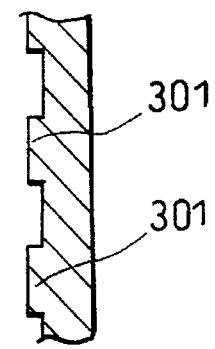
FIG. 14(b) is a cross-sectional view which shows the recording track.

In order to set the recording layer 4 so that the second recording magnetic domain 102 relatively becomes larger than the first recording magnetic domain 101, as shown in FIGS. 14(a) and 14(b), mark position recording that records information according to a position of a recording bit 40 is desirable as the recording method. However, as shown in FIGS. 15(a) and 15(b), also in a mark edge recording that records information according to a length of the recording bit, when a width 15 of a recording bit 50 is made smaller than a width 16 of a recording track, the second recording magnetic domain 102 can be relatively made larger than the first recording magnetic domain 101. Therefore, the magnetic super resolution phenomenon can be realized in the present embodiment.

Next, examination was made as to the recording magnetic domain width that can realize the magnetic super resolution phenomenon in the case where the mark edge recording is carried out by a land recording method for recording information in a land portion 301. FIGS. 16(a) and 16(b) show the case where a magneto-optical recording disk was formed on a disk substrate having a land pitch of 1.1 µm and a land width of 0.9 µm, and the recording magnetic domains having various widths ("a"µm) were formed. FIG. 17 shows a reproducing power dependency of CNR on the respective recording magnetic domains having various widths. Since a rise in the CNR accompanied by increase in the reproducing power is not observed in the case where the recording magnetic domain width is 0.9 µm, information of the recording layer 4 is transferred onto the reproductive layer 3 at room temperature. Therefore, it is clear that the magnetic super resolution phenomenon is not realized.

Meanwhile, as the recording magnetic domain width becomes smaller so as to be 0.8 µm, 0.7 µm, 0.6 µm, 0.5 µm and 0.4 µm, the rise in CNR accompanied by the rise in the reproducing power is observed, and thus the reproducing operation using the magnetic super resolution phenomenon of the present embodiment can be realized by initializing the reproductive layer 3 by the stray magnetic field 14 generated from the recording layer 4. In other words, in order to realize the magnetic super resolution phenomenon in the present embodiment, the recording magnetic domain width may be set so as to be smaller than the width of the recording track, namely, a width of a land 301.

Figure 18A:
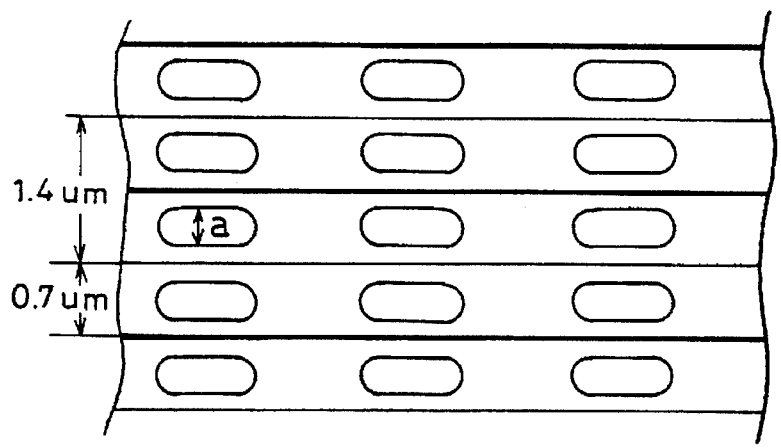
FIG. 18(a) is a plan view which shows a recording track.
Figure 18B:
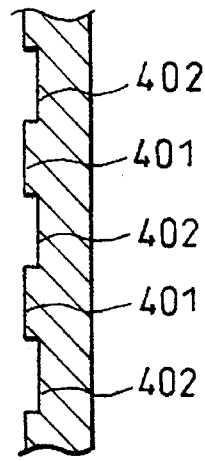
FIG. 18(b) is a cross-sectional view which shows the recording track.
Figure 19:
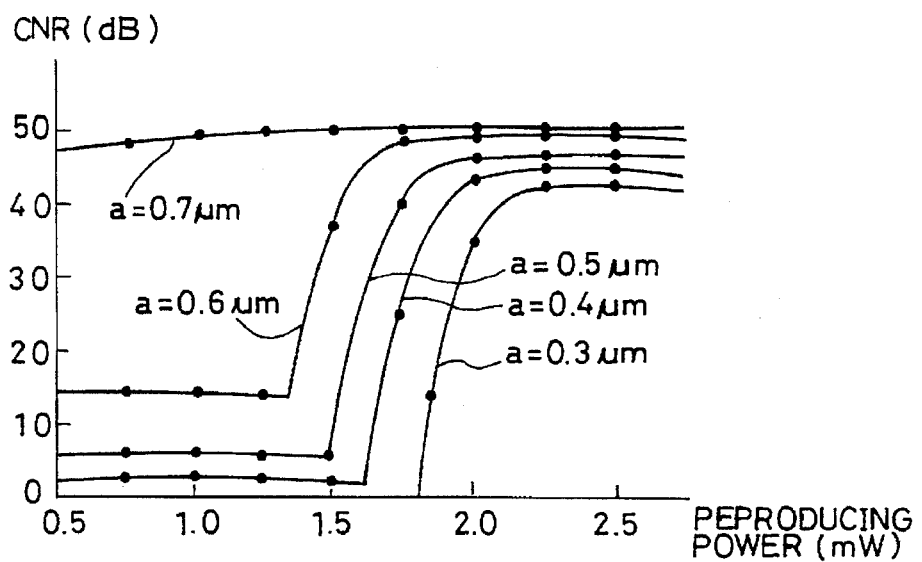
FIG. 19 is a graph which shows a reproducing power dependency of CNR of the magneto-optical recording medium.

FIGS. 18(a) and 18(b) show the case where the mark edge recording was carried out on a disk having a land pitch of 1.4 µm and land and groove widths of 0.7 µm by the land/groove recording method that records information on both a land portion 401 and a groove portion 402. Moreover, FIG. 19 shows the reproducing power dependency of the CNR in the case where the recording magnetic domain width ("a"µm) of FIGS. 18(a) and 18(b) is changed. When the recording magnetic domain width is 0.7 µm, the rise in the CNR accompanied by the increase in the reproducing power is not observed. Therefore, the reproducing operation using the magnetic super resolution phenomenon of the present embodiment such that the reproductive layer 3 is initialized by the stray magnetic field 14 generated from the recording layer 4 cannot be realized.

Meanwhile, as the recording magnetic domain width becomes smaller so as to be 0.6 µm, 0.5 µm, 0.4 µm and 0.3 µm, the rise in the CNR accompanied by the increase in the reproducing power is observed. Therefore, the reproducing operation using the magnetic super resolution phenomenon of the present embodiment by initializing the reproductive layer 3 by the stray magnetic field 14 generated from the recording layer 4 can be realized. In other words, in order to realize the magnetic super resolution phenomenon in the present embodiment, the recording magnetic domain width may be set so as to be smaller than the width of the recording track, namely, the width of the land 401 or the groove 402.

[EMBODIMENT 3]

The following describes another example of the reproducing method of the present invention in reference to FIGS. 20 through 24. The magneto-optical disk, where as shown in FIGS. 18(a) and 18(b), the recording magnetic domain with the pitch of 0.8 µm and the diameter of 0.4 µm is recorded on both the lands and the grooves, is used in the present embodiment.

Figure 20:
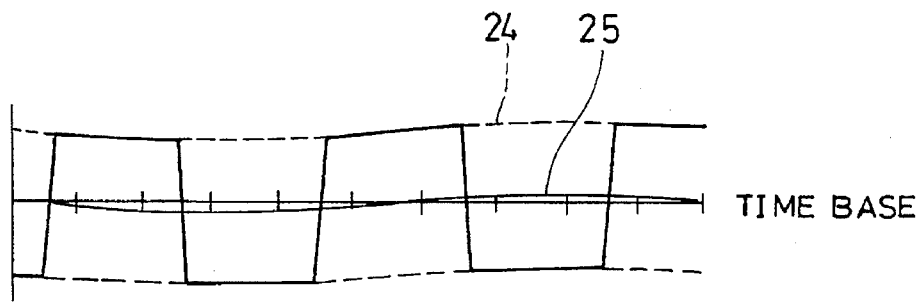
FIG. 20 is an explanatory drawing which shows a reproductive signal waveform of the magneto-optical recording medium of the present invention.

FIG. 20 shows a signal waveform of a reproducing output obtained at the time of the reproduction. It is clear that the rising and falling of the reproductive signal are extremely abrupt as described in the embodiment 1.

Figure 21:
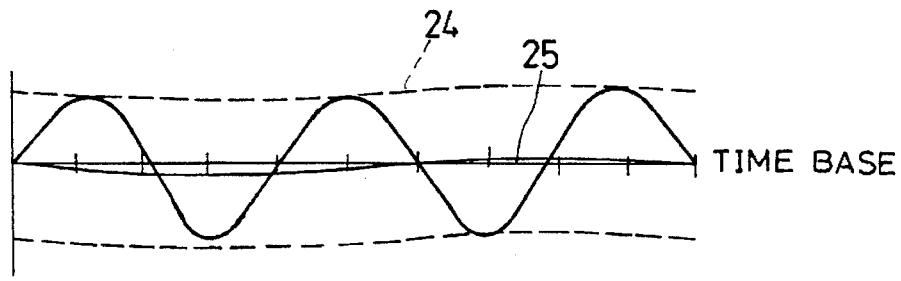
FIG. 21 is an explanatory drawing which shows a reproduced signal waveform of a conventional magneto-optical recording medium.

FIG. 21 shows one example of the reproductive signal obtained from the magneto-optical disk composed of a magnetic monolayer that is generally used. The recording magnetic domain on the light beam spot moves accompanied by the move of a light beam, and thus the reproductive signal having a shape close to a sine curve can be obtained.

In general, since a differential detecting method is used for a magneto-optical recording medium, the reproductive signal is obtained with fluctuations in its amplitude due to a change in reflectance being reduced to some degree. However, since fluctuations in the signal amplitude, which cannot be reduced by the differential detection, remain due to fluctuations in double refraction, the reproductive signal gently fluctuates as shown in FIG. 21. In this case, if a constant voltage level is a slice level, an accurate position of the recording magnetic domain cannot be detected due to the gentle fluctuations in the signal amplitude.

Figure 23:
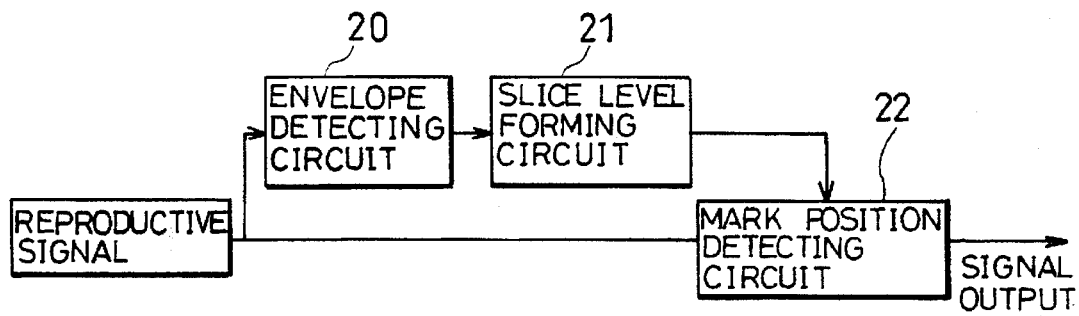
FIG. 23 is a block diagram which shows a reproductive signal processing circuit.

In order to reduce such a reproducing error due to the fluctuations, a final signal is generally obtained by envelope detection. FIG. 23 is a block diagram which shows a signal processing circuit. An envelope 24 of the reproductive signal is detected by an envelope detecting circuit 20. Then, an average level is set to an envelope slice level 25 by a slice level forming circuit 21, and thus fluctuations in the position of the recording magnetic domain due to the gentle fluctuations in the signal amplitude are reduced. Then, the accurate position is detected by a mark position detecting circuit 22.

Similarly to the signal waveform of the present embodiment shown in FIG. 20, the signal amplitude gently fluctuates. As to such fluctuations, since the rising and the falling of the reproductive signal are abrupt compared to the case of FIG. 21, even in the case where the constant voltage level is the slice level, the position can be detected more accurately than the case of FIG. 21. However, it is desirable that a final signal is obtained by envelope detection shown in FIG. 23 similarly to the case of FIG. 21. However, in the case where the reproductive signal is processed by the envelope detection by means of a circuit shown in FIG. 23, the reproductive signal should be also delayed according to delay due to the envelope detection. As a result, the circuit becomes complicated, and the slice level obtained by the envelope detection should be elaborately synchronized with the reproductive signal.

Figure 22:
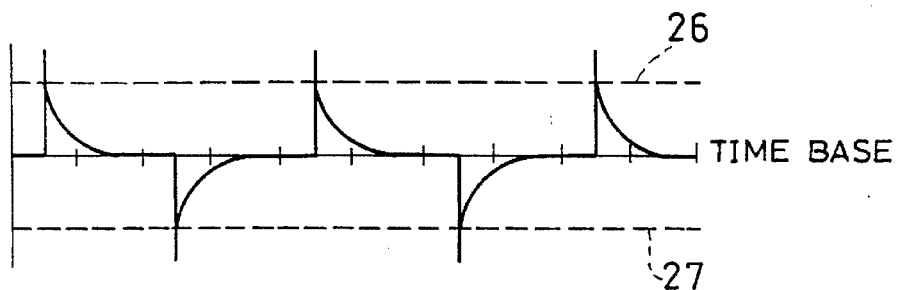
FIG. 22 is an explanatory drawing which shows a differential processing signal of the reproductive signal waveform of FIG. 20.
Figure 24:
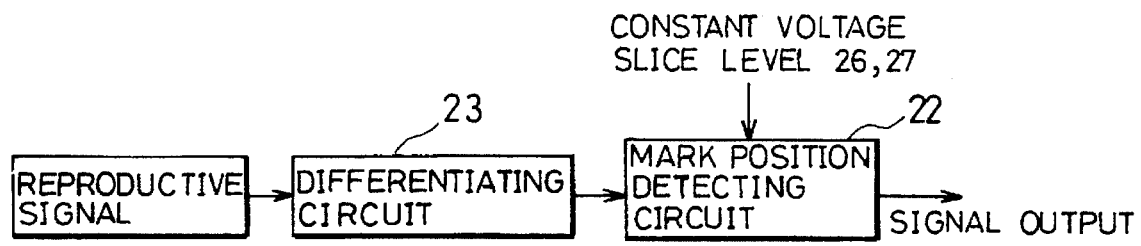
FIG. 24 is a block diagram which shows the reproductive signal processing circuit of the present invention.
Figure 25:
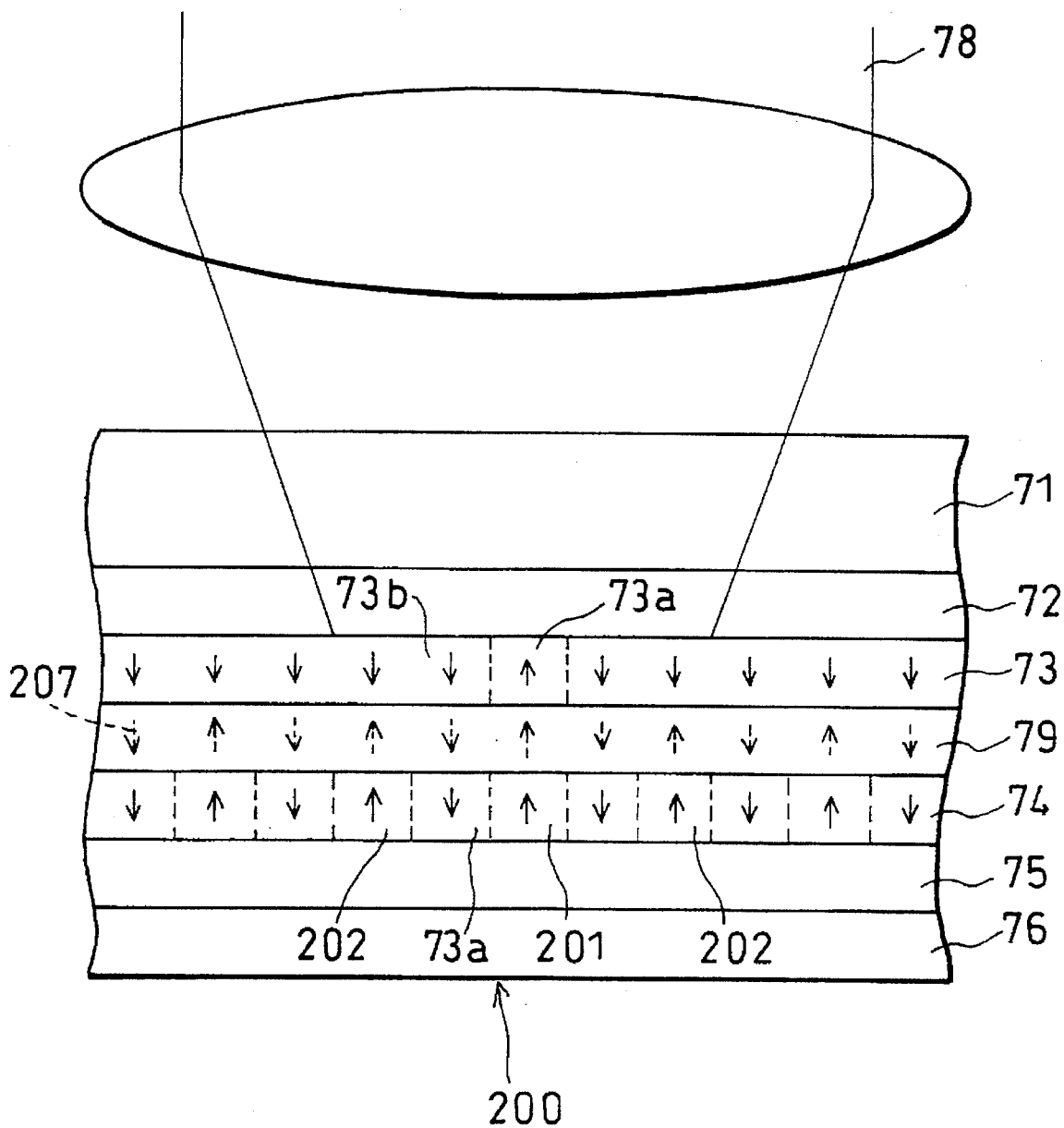
FIG. 25 is an explanatory drawing which shows a schematic arrangement of a conventional magneto-optical recording medium.

FIG. 22 shows a signal waveform obtained by differentiating the signal waveform of the present embodiment shown in FIG. 20. According to the conventional waveform shown in FIG. 21, even if the differentiating process is carried out, only the phase is changed, and it is hard to make a great change of the waveform. However, in FIG. 20, since the rising and the falling of the reproductive signal are extremely abrupt, the gentle fluctuations of the reproductive signal amplitude can be removed by differentiating the reproductive signal. As a result, only a portion where the fluctuations of the reproductive signal is abrupt, namely, only the rising and the falling portions of the reproductive signal can be obtained as a differential output. In the present embodiment, since the gentle fluctuations in the signal amplitude can be removed by differentiating the signal waveform, the reproductive signal having the accurate position of the recording magnetic domain can be obtained. FIG. 24 is a block diagram which shows the reproducing signal processing circuit. The reproductive signal can be processed accurately only by mounting a differentiating circuit 23 to a preceding stage of the mark position detecting circuit 22.

According to the present embodiment, the satisfactory reproducing characteristic can be obtained in the mark length recording shown in FIGS. 15(a) and 15(b). For example, as shown in FIG. 22, when two kinds of constant voltage slice levels 26 and 27 are used, the positions of the rising and the falling of the signal can be detected accurately and separately. Moreover, the differential output shown in FIG. 22 is further differentiated, the positions of the rising and falling of the signal can be simultaneously and accurately detected at one constant voltage slice level.

In addition, CNR required for the reproductive signal can be controlled by using the differentiating process. In a conventional manner, when the CNR before signal processing is not more than 45 dB, an error rate of about $1\times10^{-5}$ required for the magneto-optical disk cannot be obtained. However, when the differentiating process is used, the error rate of not more than $1\times10^{-5}$ can be obtained by realizing the CNR of not less than 35 dB before the signal process.

The test data showing that the recording/reproducing at high density is possible are shown in TABLE 3. In the TABLE 3, CNR1 and Er1 represent respectively the CNR and the error rate of the reproductive signal of the conventional magneto-optical disk shown in FIG. 21. CNR2 and Er2 represent respectively the CNR and the error rate of the reproductive signal of the magneto-optical disk of the present embodiment shown in FIG. 20. Er3 represents the error rate of the differentially processed signal (see FIG. 22) of the reproductive signal shown in FIG. 20.

TABLE 3

| Bit length (μm) | CNR 1 (dB) | Er 1 ($\times 10^{-5}$) | CNR 2 (dB) | Er 2 ($\times 10^{-5}$) | Er 2 ($\times 10^{-5}$) |
| --- | --- | --- | --- | --- | --- |
| 0.8 | 48 | 0.3 | 49 | 0.2 | 0.1 |
| 0.6 | 45 | 0.4 | 47 | 0.3 | 0.1 |
| 0.5 | 43 | 1.3 | 48 | 0.4 | 0.2 |
| 0.4 | 39 | 5.4 | 47 | 0.3 | 0.2 |
| 0.35 | — | — | 41 | 1.2 | 0.4 |
| 0.3 | — | — | 39 | 5.6 | 0.8 |
| 0.25 | — | — | 24 | 17.0 | 4.8 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium, comprising:
   a recording layer having a recording magnetic domain where information is recorded in a perpendicular magnetization direction; and
   a reproductive layer where its magnetization is reversed by a stray magnetic field generated from the recording magnetic domain,
   wherein said reproductive layer includes:
      a first reproductive layer where a stable magnetic domain width is larger than the recording magnetic domain width at room temperature and is smaller than the recording magnetic domain width at a higher temperature than a first critical temperature, said stable magnetic domain width is a minimum width in which the magnetic domain stably exists; and
      a second reproductive layer where a stable magnetic domain width is smaller than the recording magnetic domain width at room temperature and is larger than the recording magnetic domain width at a higher temperature than a second critical temperature that is set higher than the first critical temperature.

2. The magneto-optical recording medium as defined in claim 1, wherein each Curie temperature of said first reproductive layer and said second reproductive layer is higher than the second critical temperature.

3. The magneto-optical recording mediums defined in claim 1, wherein:
   said first reproductive layer is rare earth transition metal alloy having TM-rich composition where a ratio of transition metal to rare earth metal is larger than that of its compensation composition at room temperature, said first reproductive layer having a compensation temperature that is close to room temperature,
   said second reproductive layer is rare earth transition metal alloy having RE-rich composition where a ratio of transition metal to rare earth metal is smaller than that of its compensation composition at room temperature.

4. The magneto-optical recording medium as defined in claim 3, wherein said first reproductive layer and said second reproductive layer are composed of same elements.

5. The magneto-optical recording medium as defined in claim 4, wherein:
   said first reproductive layer is $Gd_{X1}(Fe_{Y1}Co_{1-Y1})_{1-X1}$,
   said second reproductive layer is $Gd_{X2}(Fe_{Y2}Co_{1-Y2})_{1-X2}$,
   Y1=0.66, Y2=0.66, $0.14 \leq X1 \leq 0.24$ and $0.29 \leq X2 \leq 0.34$.

6. The magneto-optical recording medium as defined in claim 4, wherein:

said first reproductive layer is $Gd_{X1}(Fe_{Y1}Co_{1-Y1})_{1-X1}$, said second reproductive layer is $Gd_{X2}(Fe_{Y2}Co_{1-Y2})_{1-X2}$, Y1=0.80, Y2=0.80, $0.12 \leq X1 \leq 0.22$ and $0.31 \leq X2 \leq 0.38$.

7. The magneto-optical recording medium as defined in claim 1, wherein the thickness of said first reproductive layer is 10 nm to 50 nm.

8. The magneto-optical recording medium as defined in claim 1, wherein the thickness of said second reproductive layer is 10 nm to 50 nm.

9. The magneto-optical recording medium as defined in claim 1, wherein the Curie temperature of said recording layer is higher than the second critical temperature.

10. The magneto-optical recording medium as defined in claim 1, wherein said recording layer has a compensation point that is close to room temperature.

11. The magneto-optical recording medium as defined in claim 1, wherein the thickness of said recording layer is 20 nm to 200 nm.

12. The magneto-optical recording medium as defined in claim 1 further comprising an intermediate layer that is selected from a group composed of a non-magnetic film and an in-plane magnetization film, said intermediate layer being formed between said recording layer and said reproductive layer.

13. The magneto-optical recording medium as defined in claim 12, wherein the thickness of said intermediate layer is 1 nm to 60 nm.

14. The magneto-optical recording medium as defined in claim 1, wherein:

said recording layer has a first recording magnetic domain and a second recording magnetic domain where their perpendicular magnetization directions are antiparallel with each other, said first recording magnetic domain having a smaller width than that of said second recording magnetic domain, in said first reproductive layer, said stable magnetic domain width is larger than the first recording magnetic domain width at room temperature, and is smaller than the first recording magnetic domain width at a higher temperature than the first critical temperature, in said second reproductive layer, said stable magnetic domain width is smaller than the first recording magnetic domain width at room temperature, and is larger than the first recording magnetic domain width at a higher temperature than the second critical temperature.

15. A method for reproducing information stored in an magneto-optical recording medium, comprising the steps of:

configuring a magneto-optical recording medium including a recording layer having a recording magnetic domain where information is recorded in a perpendicular magnetization direction; and a reproductive layer where its magnetization is reversed by a stray magnetic field generated from the recording magnetic domain, wherein said reproductive layer includes a first reproductive layer where a stable magnetic domain width is larger than the recording magnetic domain width at room temperature and is smaller than the recording magnetic domain width at a higher temperature than a first critical temperature, said stable magnetic domain width is a minimum width in which the magnetic domain stably exists; and a second reproductive layer where a stable magnetic domain width is smaller than the recording magnetic domain width at room temperature and is larger than the recording magnetic domain width at a higher temperature than a second critical temperature that is set higher than the first critical temperature; and raising the temperature of the reproductive layer so that it becomes higher than the second critical temperature by irradiating a light beam onto the reproductive layer, while obtaining a reproductive signal by preventing the temperature of the recording layer from becoming higher than a Curie temperature.

16. The reproducing method as defined in claim 15, wherein said step of raising the temperature of the reproductive layer further includes the steps of:

raising the temperature of the reproductive layer so that it becomes higher than the first critical temperature and lower than the second critical temperature while preventing the recording layer from becoming higher than the Curie temperature; and after raising the temperature of the reproductive layer so that it becomes higher than the first critical temperature and lower than the second critical temperature, raising the temperature of said reproductive layer so that it becomes higher than the second critical temperature while preventing the temperature of said recording layer from becoming higher than the Curie temperature.

17. The reproducing method as defined in claim 16, wherein in the step of raising the temperature of the reproductive layer:

the single light beam, where light intensity is higher on its center portion than on its circumferential portion, is used, the temperature of the reproductive layer is raised so that it becomes higher than the first critical temperature and lower than the second critical temperature while the temperature of the recording layer is raised so that it does not become higher than the Curie temperature by irradiating the vicinity of the center portion of the light beam onto the magneto-optical recording medium, after raising the temperature of the reproductive layer so that it becomes higher than the first critical temperature and lower than the second critical temperature, raising the temperature of the reproductive layer so that it becomes higher than the second critical temperature by irradiating the center portion of the light beam onto the magneto-optical recording medium while raising the temperature of the recording layer so that it does not become higher than the Curie temperature.

18. The reproducing method as defined in claim 15, further comprising the step of initializing the magnetization of the reproductive layer by an external magnetic field.

19. The reproducing method as defined in claim 15, further comprising the step of initializing the magnetization of the reproductive layer by a stray magnetic field of the recording layer.

20. The reproducing method as defined in claim 15, further comprising the step of detecting a position of a reproductive signal, which was obtained by the irradiation of the light beam, by slicing the reproductive signal at a constant voltage level.

21. The reproducing method as defined in claim 15, further comprising the steps of:

detecting an envelope of the reproductive signal obtained by the irradiation of the light beam; and detecting a position of a signal, which was obtained by detecting its envelope, by slicing the signal.

22. The reproducing method as defined in claim 15, further comprising the step of differentially processing the reproductive signal obtained by the irradiation of the light beam.

23. The reproducing method as defined in claim 22, further comprising the step of detecting a position of the signal, which was obtained by the differential process, by slicing the signal at two constant voltage levels.

24. The reproducing method as defined in claim 22, further comprising the steps of:
 further differentiating the signal obtained by the differential process; and
 detecting a position of the signal, which was obtained by the second differential process, by slicing the signal at a single constant voltage level.

* * * * *